United States Patent

Mori et al.

[11] 4,027,951
[45] June 7, 1977

[54] PARFOCAL LOW-MAGNIFICATION MICROSCOPE OBJECTIVE LENS SYSTEMS

[75] Inventors: Ikuo Mori; Yoshiyuki Shimizu, both of Kawasaki, Japan

[73] Assignee: Nippon Kogaku K.K., Tokyo, Japan

[22] Filed: Oct. 10, 1975

[21] Appl. No.: 621,347

[30] Foreign Application Priority Data

Oct. 19, 1974 Japan .................. 49-11989

[52] U.S. Cl. .................. 350/175 ML; 350/215; 350/217; 350/220
[51] Int. Cl.² .................. G02B 21/02
[58] Field of Search .......... 350/215, 226, 227, 217, 350/175 ML, 220

[56] References Cited

UNITED STATES PATENTS 3,176,583  4/1965  Klein .................. 350/175 ML
3,744,881  7/1973  Taira .................. 350/227

Primary Examiner—John K. Corbin
Assistant Examiner—Conrad Clark
Attorney, Agent, or Firm—Shapiro and Shapiro

[57] ABSTRACT

A parfocal low-magnification microscope objective lens system comprises, in succession from the object side, a positive first lens member, a negative second lens member and a positive third lens member. The first lens member has its concave surface facing the object; the second lens member includes at least one negative meniscus lens component with its concave surface facing the object; and the third lens member includes a positive lens component with that surface thereof sharper in radius of curvature facing the image plane side. The lens system satisfies the following four conditions: $d_A < f_A < d_A + |f_B|$; $d_A < d_B$; $|f_B| < |f_A|$; and $|d_B| > |f_B|$; where $f_A$ and $f_B$ are the focal lengths of the first and the second lens member, respectively, $d_A$ is the distance from the rear principal plane of the first lens member to the front principal plane of the second lens member, and $d_B$ is the distance from the rear principal plane of the second lens member to the front principal plane of the third lens member.

4 Claims, 20 Drawing Figures

SPHERICAL ABERRATION

ASTIGMATISM

DISTORTION

— LATERAL SPHERICAL ABERRATION
—·— COMA AT y=6
- - - COMA AT y=9

SPHERICAL ABERRATION

ASTIGMATISM

DISTORTION

—·— COMA AT y=6
------ COMA AT y=9

COMA AT y=6
COMA AT y=9

SPHERICAL ABERRATION

ASTIGMATISM

DISTORTION

PARFOCAL LOW-MAGNIFICATION MICROSCOPE OBJECTIVE LENS SYSTEMS

BACKGROUND OF THE INVENTION

1. Field of the Invention

This invention relates to a parfocal low-magnification microscope objective lens.

2. Description of the Prior Art

The recent desire to observe objects in a wider view field has given rise to the need for low-magnification microscope objectives. However, existing microscope devices have been designed for use with 10X or higher magnification objectives, and accordingly, the shoulder height and body tube length are fixed, with the shoulder height generally being ¼ to 1/5 of the body tube length. For objective lenses of low magnification, say 1X or 2X, it is extremely difficult to maintain the same shoulder height and body tube length as for high-magnification objectives. If the objective is considered to be a thin lens, the value obtained by dividing the distance from the objective lens to the formed image by the distance from the object to the objective lens is the image magnification of the lens, and hence, for 2X magnification to be provided, the distance from the object to the objective lens must be ½ of the distance from the objective lens to the formed image. Likewise, where 1X magnification is desired, the objective lens must be located just at the mid-point between the object and the image point, whereas the distance allowable for a component forming part of the objective lens to keep a distance from the object in order to maintain parfocalism is limited by the shoulder height.

Such difficulty in distance may be overcome by providing a diverging lens at a location nearer to the object to increase the distance from the optical axis to the light rays which leave the object point on the optical axis and then pass through the lens. A positive lens is provided at a location as remote as possible from the object under the limitation of the shoulder height, thereby enabling an image to be formed at a suitable magnification. However, the negative power of the diverging lens is very great for the power of the entire system and, as a result, there is the disadvantage of substantial aberration.

Further, the microscope objective lens must take into account its relation with an illuminating system therefor. Most illuminating systems now available are of the so-called telecentric type, which requires the pupil of incidence of the objective to be located at infinity.

This problem may be solved by providing a positive lens between the negative lens and the object and thereby stopping down the light beam from the off-axis object point. However, this would require providing such positive lens with a configuration in which spherical aberration is well corrected with respect to the principal rays from the off-axis object point which are parallel to the optical axis. Also, in such an arrangement wherein first convex and concave components and a second convex component are successively disposed in the named order from the object side, the Petzval sum thereof is made generally negative by the negative lens. In order to alleviate this, it is desirable to minimize the power of the negative lens as much as possible, and it is known that this may be achieved by locating the negative lens in the middle of the distance from the second positive lens to the object (a distance substantially equal to the shoulder height).

SUMMARY OF THE INVENTION

The present invention has for its primary object to provide a parfocal low-magnification microscope lens system in which a power arrangement is given to lens constructions already known in principle and in which various aberrations are well corrected.

According to the present invention, the parfocal low-magnification microscope lens system comprises a positive first lens member disposed at a position nearest to the object and with its convex surface facing the object, a negative second lens member disposed at a position farther from the object than the first lens member and including at least one negative meniscus lens component, and a third positive lens member disposed at a position farthest from the object, this lens member including a positive lens component with that surface thereof sharper in radius of curvature facing the image plane side. The lens system satisfies the following conditions:

$$d_A < f_A < d_A + |f_B| \quad (1);$$
$$d_A < d_B \quad (2);$$
$$|f_B| < |f_A| \quad (3); \text{ and}$$
$$|d_B| < |f_B| \quad (4);$$

where $f_A$ is the focal length of the first lens member, $f_B$ is the focal length of the second lens member, $d_A$ is the distance from the rear principal plane of the first lens member to the front principal plane of the second lens member, and $d_B$ is the distance from the rear principal plane of the second lens member to the front principal plane of the third lens member.

The invention will become more fully apparent from the following detailed description thereof taken in conjunction with the accompanying drawings.

DESCRIPTION OF THE PREFERRED EMBODIMENT

Figure 1:
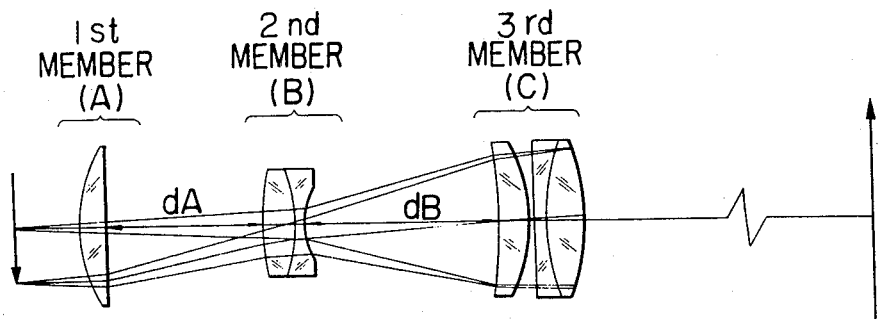
FIG. 1 is a cross-sectional view of the lens system according to a first embodiment of the invention.
Figure 2A:
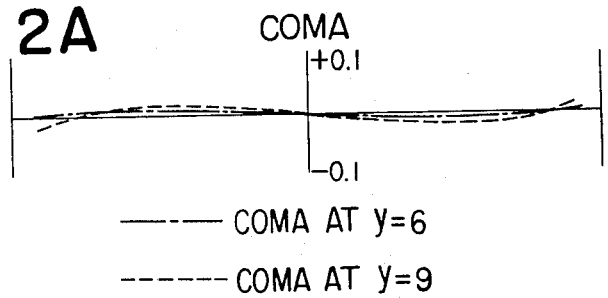
FIGS. 2A, 2B, 2C and 2D are graphs for coma, spherical aberration, astigmatism and distortion, respectively, for the lens system of FIG. 1.
Figure 2B:
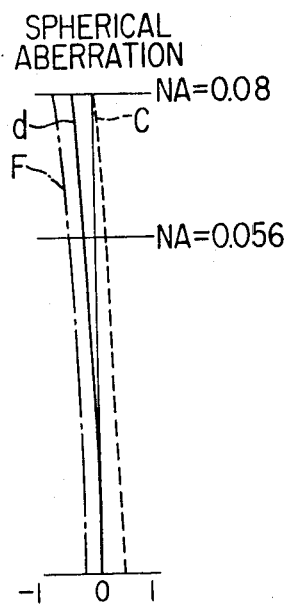
Figure 2C:
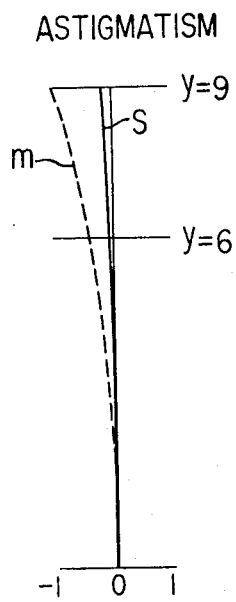
Figure 2D:
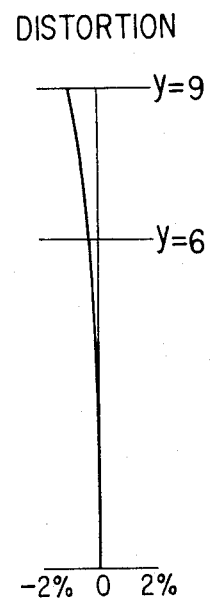

Referring to FIG. 1, the lens system includes, in succession from the object side, a positive first lens member A with its convex surface facing the object, negative second lens member B including at least one negative meniscus component with its convex surface facing the object, and a positive third lens member C comprising a positive component.

In this lens construction, let $f_A$ and $f_B$ be the focal lengths of the first and the second lens member, respectively, $d_A$ the distance from the rear principal plane of the first lens member to the front principal plane of the second lens member, and $d_B$ the distance from the rear principal plane of the second lens member to the frnt principal plane of the third lens member.

With regard to the range of $f_A$, the iris stop of a lens system is usually such that, due to the screw for securing the entire objective lens system to the turning portion of the microscope being located in the vicinity of the third lens member, the brightest lens system may be provided without vignetting under the mechanical limitation that the shoulder height must be of a predetermined value. Further, from the requirement that the second lens member must be located near the midpoint between the location of the virtual image of the object formed by the first lens member and the third lens member, the focal point of the first lens member is required to be located nearer to the object than that of the second lens member and nearer to the image side than the principal point of the second lens member. Thus, the following relation or condition must be satisfied:

$$d_A < f_A < d_A + |f_B| \quad (1)$$

Further, the object point is enlarged by the first lens member and from the consequent requirement that the second lens member be located at the mid-point between the object point and the third lens member, whereby the following condition must be satisfied:

$$d_A < d_B \quad (2)$$

If these conditions are not satisfied, it will of course be impossible within the distance limitation to make oblique light rays parallel to the principal light rays and much vignetting will occur on the image plane.

Next, to overcome the distance limitation attributable to the shoulder height and the body tube length, the negative refractive power of the second lens member is made greater than that of the first lens member, and a limitation is imposed upon the air space immediately following the second lens member, whereby it becomes possible to secure a great distance from the last surface of the lens system to the image plane. Thus, there are these two conditions which must be satisfied:

$$|f_B| < |f_A| \quad (3)(4)$$

If such ranges are exceeded, the distance limitation cannot be overcome and the lens cannot be used as a parfocal lens identical with other high-magnification objectives.

Also, the second lens member, which is located at a position of about half the shoulder height, must have a greater refractive power in a low-magnification objective lens system, but because of the different action and magnification of the first lens member, the magnification of the objective lens system and the refractive power of the second lens member are not always in inverse proportion to each other.

In the present invention, the inclination of the light rays emergent from the axial object point when such rays pass through the second lens member is about 4.5 to 6 times that on the image side. More specifically, when the magnification of the objective lens is 2×, the inclination is about 4.5 times and when the magnification of the objective lens is 1×, the inclination is about 6 times. Therefore, the focal length of the second lens member must be about 1/5 of the total length of the lens system when the magnification of the objective lens system is 2×, and about ¼ when the magnification of the objective lens system is 1×.

The third lens member is selected to have a suitable power for providing a predetermined magnification.

The problem of making the principal rays parallel and the distance limitation are overcome as described above, while on the other hand aberrations still leave difficulties in that due to the asymmetry of the lens system itself and the great negative refractive power of the second lens group, spherical aberration is aggravated in the positive direction and a great deal of lateral aberration of the oblique rays passing under the principal rays occurs in the negative direction. The occurrence of this lateral aberration is especially pronounced.

In accordance with the invention, the lens member of the second group is provided by a meniscus lens with its convex surface facing the object side, thereby minimizing the negative lateral aberration occurring in the second group and two positive lenses are disposed as the third group, of which that lens nearer to the object is arranged in such a manner that one surface thereof sharper in radius of curvature faces the image plane side, whereby correction of the off-axis lateral aberration and spherical aberration are achieved. However, if the conditions shown above are exceeded, the coma of the light beam passing under the principal rays will occur pronouncedly in the negative direction and this may not be corrected by any other lens. Also, if that surface of the third lens member which is sharper in radius of curvature does not face the image plane side, spherical aberration will increase and symmetrically good correction of the off-axis lateral aberration may not be attained. The lens of Example I is thus obtained which is a low-magnification microscope objective with a flat image plane which achieves the above-mentioned object of the present invention and in which the various aberrations have been well corrected.

Several examples of the present invention will be given, Example I being based upon the showing of FIG. 1 and the related graphs of FIGS. 2A, 2B, 2C and 2D.

EXAMPLE I

| | | | | | | | | |
|---|---|---|---|---|---|---|---|---|
| 1st member (A) | $R_1$ = | 14.8 | | WD | = | 5.5 | | |
| | $R_2$ = | −600.0 | | $d_1$ | = | 2.2 | $n_1 = 1.58913$ | $d_1 = 61.2$ |
| | | | $(d_A)$ $d_2$ | = | 13.1 | | | |
| 2nd member (B) | $R_3$ = | 45.0 | | $d_3$ | = | 3.0 | $n_2 = 1.74077$ | $d_2 = 27.7$ |
| | $R_4$ = | −16.0 | | $d_4$ | = | 0.5 | $n_3 = 1.713$ | $d_3 = 53.9$ |
| | $R_5$ = | 5.487 | | | | | | |

EXAMPLE I-continued

|  |  |  | ($d_R$) $d_5$ | = | 16.7 |  |  |
|---|---|---|---|---|---|---|---|
| 3rd member (C) | $R_6$ | = | −54.8 | | | | |
| | | | $d_6$ | = | 2.8 | $n_4 = 1.51823$ | $d_4 = 59.0$ |
| | $R_7$ | = | −12.7 | | | | |
| | | | $d_7$ | = | 0.1 | | |
| | $R_8$ | = | 360.0 | | | | |
| | | | $d_8$ | = | 1.0 | $n_5 = 1.7495$ | $d_5 = 35.0$ |
| | $R_9$ | = | 18.85 | | | | |
| | | | $d_9$ | = | 3.1 | $n_6 = 1.50032$ | $d_6 = 81.9$ |
| | $R_{10}$ | = | −20.38 | | | | |

| $\beta$ | = | −2.0 | Magnification |
| NA | = | 0.08 | Numerical aperture |
| BD | = | 146.373 | Distance from rearmost surface of the lens to image plane |
| LD | = | 48.0 | Distance from the object surface to the rearmost surface of the lens |
| TL | = | 194.373 | Distance from the object surface to image plane |
| f | = | 67.985 | Composite focal length of the entire system |
| $f_A$ | = | 24.6 | Composite focal length of 1st member A |
| $f_B$ | = | −9.3 | Composite focal length of 2nd member B |
| $\Sigma P$ | = | −0.006 | Petzval sum | and where:
WD indicates working distance;
R indicates the radius of curvature;
d indicates lens thickness of air spacing;
n indicates the refractive index; and
vd indicates the Abbe number of glass wherein each index shows the order from the object side.

Figure 3:
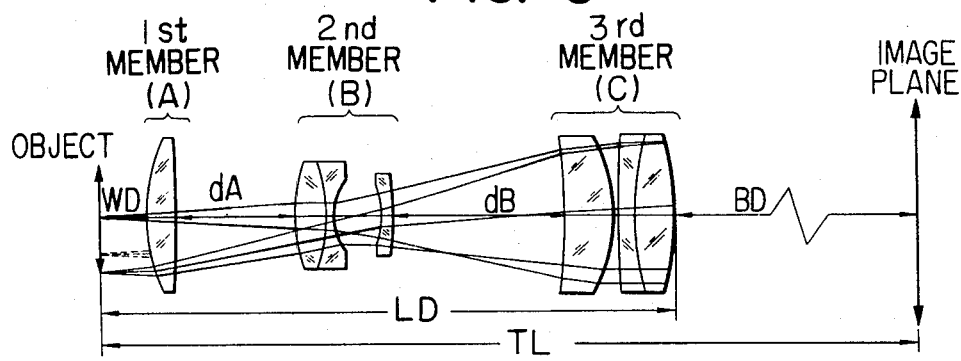
FIG. 3 is a cross-sectional view of a lens system according to a second embodiment of the invention.
Figure 4A:
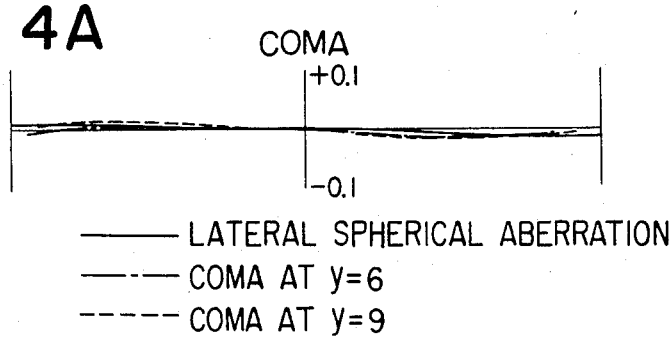
FIGS. 4A, 4B, 4C and 4D are graphs for coma, spherical aberration, astigmatism and distortion, respectively, for the lens system of FIG. 3.
Figure 4B:
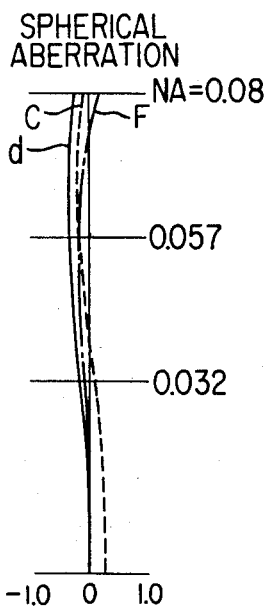
Figure 4C:
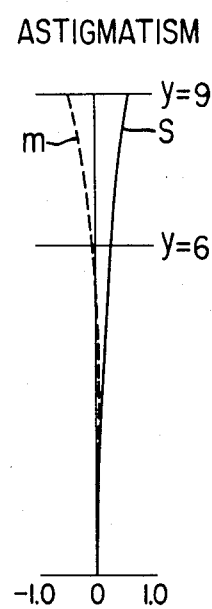
Figure 4D:
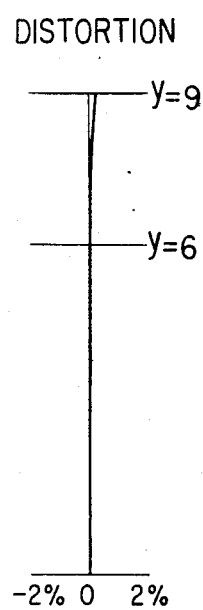

Example II is a lens system developed from that of Example I. In this way, the correction of various aberrations and the above-mentioned object of the invention can also be achieved by replacing the second member consisting of a single negative with two negative lenses as shown in FIG. 3 and the related graphs of FIGS. 4A, 4B, 4C and 4D. It is apparent that this Example also satisfies all the conditions shown in Example I.

EXAMPLE II

| | | | | WD | = | 4.0 | | |
|---|---|---|---|---|---|---|---|---|
| 1st member (A) | $R_1$ | = | 17.0 | | | | | |
| | | | | $d_1$ | = | 2.5 | $n_1 = 1.65128$ | $d_1 = 38.3$ |
| | $R_2$ | = | −95.5 | | | | | |
| | | | | $d_2$ | = | 10.0 | | |
| 2nd member (B) | $R_3$ | = | 18.1 | | | | | |
| | | | | $d_3$ | = | 2.5 | $n_2 = 1.76182$ | $d_2 = 26.5$ |
| | $R_4$ | = | −21.2 | | | | | |
| | | | | $d_4$ | = | 0.8 | $n_3 = 1.51823$ | $d_3 = 59.0$ |
| | $R_5$ | = | 4.62 | | | | | |
| | | | | $d_5$ | = | 4.0 | | |
| | $R_6$ | = | −7.956 | | | | | |
| | | | | $d_6$ | = | 2.0 | $n_4 = 1.7495$ | $d_4 = 35.0$ |
| | $R_7$ | = | −20.8 | | | | | |
| | | | | $d_7$ | = | 14.5 | | |
| 3rd member (C) | $R_8$ | = | −53.1 | | | | | |
| | | | | $d_8$ | = | 3.5 | $n_5 = 1.58894$ | $d_5 = 61.04$ |
| | $R_9$ | = | −16.559 | | | | | |
| | | | | $d_9$ | = | 0.3 | | |
| | $R_{10}$ | = | 70.1 | | | | | |
| | | | | $d_{10}$ | = | 1.4 | $n_6 = 1.71736$ | $d_6 = 29.5$ |
| | $R_{11}$ | = | 21.0 | | | | | |
| | | | | $d_{11}$ | = | 3.3 | $n_7 = 1.50032$ | $d_7 = 81.9$ |
| | $R_{12}$ | = | −26.584 | | | | | |

| $\beta$ | = | −2.0 | Magnification |
| NA | = | 0.08 | Numerical aperture |
| BD | = | 145.706 | Distance from rearmost surface of the lens to image plane |
| LD | = | 48.8 | Distance from the object surface to the rearmost surface of the lens |
| TL | = | 194.506 | Distance from the object surface to image plane |
| f | = | 74.718 | Composite focal length of the entire system |
| $f_A$ | = | 22.354 | Composite focal length of 1st member A |
| $f_B$ | = | −9.286 | Composite focal length of 2nd member B |
| $\Sigma P$ | = | −0.0217 | Petzval sum |

Note:
A negative lens is added to the second member B in the first embodiment.

and where:
WD indicates working distance;
R indicates the radius of curvature;
d indicates lens thickness and air spacing;
n indicates the refractive index; and
vd indicates the Abbe number of glass wherein each index shows the order from the object side.

Figure 5:
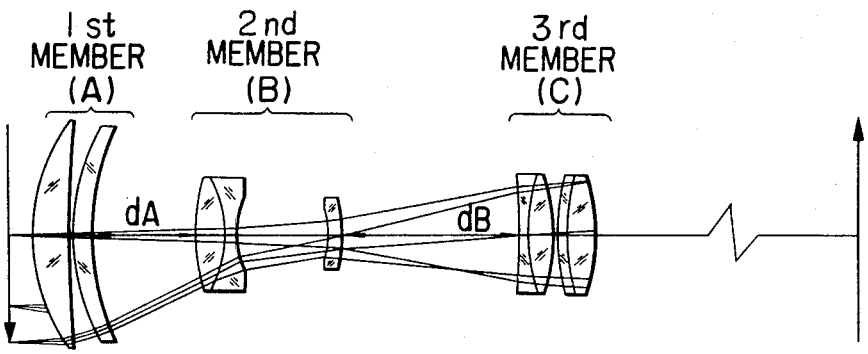
FIG. 5 is a cross-sectional view of a lens system according to a third embodiment of the invention.
Figure 6A:
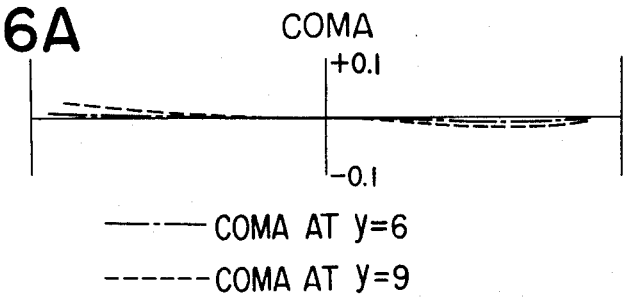
FIGS. 6A, 6B, 6C and 6D are graphs for coma, spherical aberration, astigmatism and distortion, respectively, for the lens system of FIG. 5.
Figure 6B:
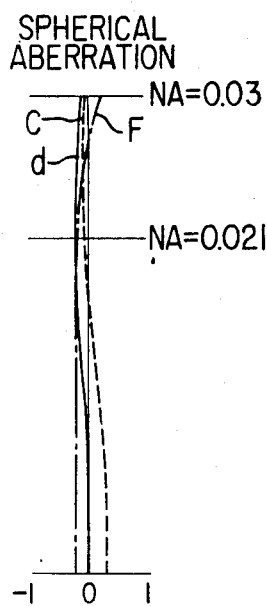
Figure 6C:
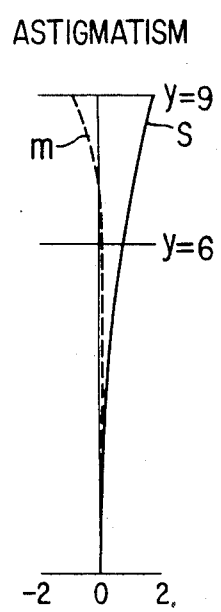
Figure 6D:
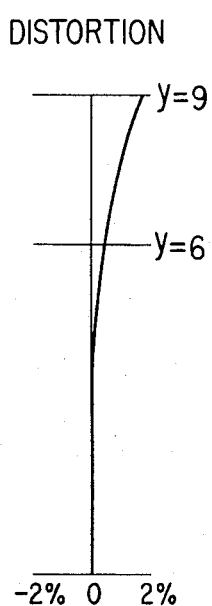

Example III is intended for the purpose of providing an objective lens lower in magnification than Example II; namely, a lens of 1X magnification, but in view of the increasing numerical view field of the object, this Example employs two positive lenses, instead of a single positive one, in the first member. This serves to prevent occurrence of spherical aberration in the first group to the utmost, and although the numerical view field of the object is increased thereby, all the principal rays are made parallel. It is again apparent that this Example satisfies all the conditions shown in Example I. FIG. 5 illustrates this embodiment and the related graphs are shown in FIGS. 6A, 6B, 6C and 6D.

and where:
WD indicates working distance;
R indicates the radius of curvature;
$d$ indicates lens thickness and air spacing; p1 $n$ indicates the refractive index; and
$vd$ indicates the Abbe number of glass wherein each index shows the order from the object side.

Figure 7:
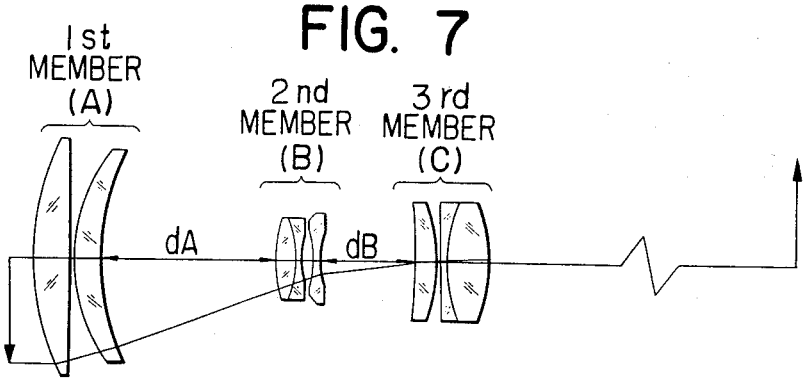
FIG. 7 is a cross-sectional view of a lens system according to a fourth embodiment of the invention.
Figure 8A:
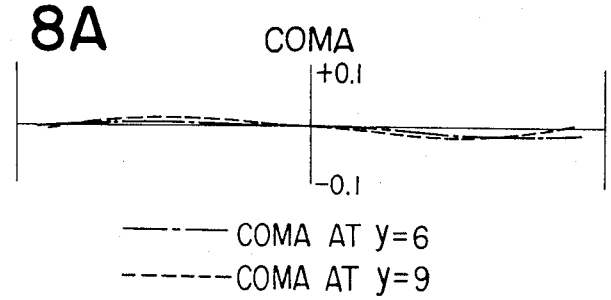
FIGS. 8A, 8B, 8C, and 8D are graphs for coma, spherical aberration, astigmatism and distortion, respectively, for the lens system of FIG. 7.
Figure 8B:
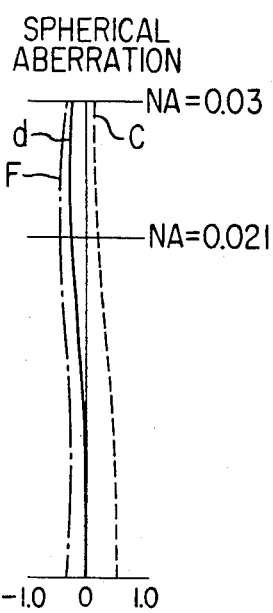
Figure 8C:
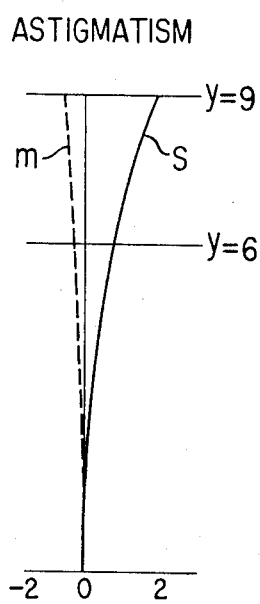
Figure 8D:
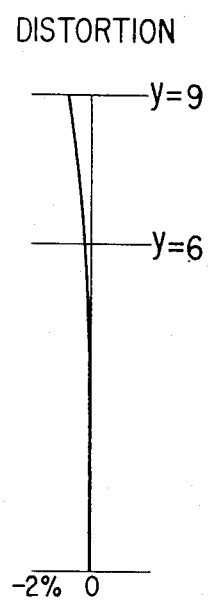

Example IV is meant for the same purpose as Example III and satisfies the conditions shown in Example I. FIG. 7 shows this embodiment and the related graphs are shown in FIGS. 8A, 8B, 8C and 8D.

EXAMPLE III

| Member | R | | d | | n | | vd |
|---|---|---|---|---|---|---|---|
| | | | WD = 2.0 | | | | |
| 1st member (A) | $R_1$ = 16.3 | | $d_1$ = 2.9 | | $n_1$ = 1.713 | | $d_1$ = 53.9 |
| | $R_2$ = 74.0 | | $d_2$ = 0.2 | | | | |
| | $R_3$ = 17.0 | | $d_3$ = 1.7 | | $n_2$ = 1.62004 | | $d_2$ = 36.3 |
| | $R_4$ = 24.0 | | | | | | |
| | | ($d_A$) | $d_4$ = 8.8 | | | | |
| 2nd member (B) | $R_5$ = 27.0 | | $d_5$ = 2.4 | | $n_3$ = 1.76182 | | $d_3$ = 26.5 |
| | $R_6$ = −8.0 | | $d_6$ = 0.8 | | $n_4$ = 1.74443 | | $d_4$ = 49.4 |
| | $R_7$ = 5.72 | | $d_7$ = 7.8 | | | | |
| | $R_8$ = −5.03 | | $d_8$ = 1.0 | | $n_5$ = 1.74443 | | $d_5$ = 49.4 |
| | $R_9$ = −27.0 | | | | | | |
| | | ($d_B$) | $d_9$ = 15.2 | | | | |
| 3rd member (C) | $R_{10}$ = −110.0 | | $d_{10}$ = 0.8 | | $n_6$ = 1.7495 | | $d_6$ = 35.0 |
| | $R_{11}$ = 27.84 | | $d_{11}$ = 2.1 | | $n_7$ = 1.58894 | | $d_7$ = 61.04 |
| | $R_{12}$ = −17.335 | | $d_{12}$ = 0.2 | | | | |
| | $R_{13}$ = 51.0 | | $d_{13}$ = 0.8 | | $n_8$ = 1.67163 | | $d_8$ = 38.8 |
| | $R_{14}$ = 25.3 | | $d_{14}$ = 2.2 | | $n_9$ = 1.50032 | | $d_9$ = 81.9 |
| | $R_{15}$ = −24.419 | | | | | | |

β = −1.0
NA = 0.03
BD = 145.67
LD = 48.9
TL = 194.57
f = 108.677
$f_A$ = 21.529
$f_B$ = −3.458
ΣP = −0.066

Note:
A positive lens is added to the first member A in Example II and a joined surface is newly provided in the third member C.

EXAMPLE IV

| Member | R | | d | | n | | vd |
|---|---|---|---|---|---|---|---|
| | | | WD = 2.1 | | | | |
| 1st member (A) | $R_1$ = 26.3 | | $d_1$ = 3.2 | | $n_1$ = 1.6228 | | $d_1$ = 56.9 |
| | $R_2$ = −320.0 | | $d_2$ = 0.1 | | | | |
| | $R_3$ = 14.2 | | $d_3$ = 2.2 | | $n_2$ = 1.62041 | | $d_2$ = 60.3 |
| | $R_4$ = 21.0 | | | | | | |
| | | | $d_4$ = 15.0 | | | | |
| 2nd member (B) | $R_5$ = 21.0 | | $d_5$ = 1.5 | | $n_3$ = 1.7552 | | $d_3$ = 27.5 |
| | $R_6$ = −9.0 | | $d_6$ = 0.7 | | $n_4$ = 1.713 | | $d_4$ = 53.9 |
| | $R_7$ = 9.0 | | $d_7$ = 0.5 | | | | |
| | $R_8$ = −9.0 | | $d_8$ = 0.8 | | $n_5$ = 1.713 | | $d_5$ = 53.9 |
| | $R_9$ = 4.6 | | | | | | |
| | | | $d_9$ = 16.5 | | | | |
| | $R_{10}$ = −51.0 | | $d_{10}$ = 2.0 | | $n_6$ = 1.62374 | | $d_6$ = 47.0 |

EXAMPLE IV-continued

| | | | | | | |
|---|---|---|---|---|---|---|
| 3rd member (C) | $R_{11} = -13.32$ | $d_{11} = 0.1$ | | | | |
| | $R_{12} = 105.0$ | $d_{12} = 0.6$ | $n_7 = 1.74$ | $d_7 = 28.2$ | | |
| | $R_{13} = 17.0$ | $d_{13} = 3.2$ | $n_8 = 1.50032$ | $d_8 = 81.9$ | | |
| | $R_{14} = -20.28$ | | | | | |

$$\beta = -1.0$$
$$NA = 0.03$$
$$BD = 145.755$$
$$LD = 48.5$$
$$TL = 194.255$$
$$f = 137.401$$
$$f_A = 24.0$$
$$f_B = -3.70$$
$$\Sigma P = -0.1$$

Note:
A positive lens is newly added to the first member A in Example II.

and where:
WD indicates working distance;
R indicates the radius of curvature;
d indicates lens thickness and air spacing; p1 n indicates the refractive index; and
vd indicates the Abbe number of glass wherein each index shows the order from the object side.

It is believed that the advantages and improved results furnished by the lens systems of the invention will be apparent from the foregoing description of several preferred embodiments of the invention. Various changes and modifications may be made without departing from the spirit and scope of the invention as sought to be defined in the following claims.

We claim:

1. A parfocal low-magnification microscope objective lens system comprising:
   a positive first lens member disposed at a position nearest to the object and with its convex surface facing the object;
   a negative second lens member disposed at a position farther from said object than said first lens member and including at least one negative meniscus lens component having its convex surface facing the object side; and
   a third positive lens member disposed at a position farthest from said object and including a positive lens component with that surface thereof sharper in radius of curvature facing the image plane side;
   said lens system satisfying the following four conditions:

$$d_A < f_A < d_A + |f_B| \quad (1)$$
$$d_A < d_B \quad (2),$$
$$|f_B| < |f_A| \quad (3),$$
$$|d_B| < |f_B| \quad (4),$$

where $f_A$ is the composite focal length of the first lens member, $f_B$ is the composite focal length of the second lens member, $d_A$ is a rear focal plane of the first lens member to front focal plane of the second lens member distance, and $d_B$ is a rear focal plane of the second lens member to front focal plane of the third lens member distance, the parameters of said system having the following values:

| | | WD=5.5 | | | |
|---|---|---|---|---|---|
| 1st member (A) | $R_1 = 14.8$ | $d_1 = 2.2$ | $n_1 = 1.58913$ | $vd_1 = 61.2$ | |
| | $R_2 = -600.0$ | | | | |
| | | $d_2 = 13.1$ | | | |
| 2nd member (B) | $R_3 = 45.0$ | $d_3 = 3.0$ | $n_2 = 1.74077$ | $vd_2 = 27.7$ | |
| | $R_4 = -16.0$ | $d_4 = 0.5$ | $n_3 = 1.713$ | $vd_3 = 53.9$ | |
| | $R_5 = 5.487$ | $d_5 = 16.7$ | | | |
| 3rd member (C) | $R_6 = -54.8$ | $d_6 = 2.8$ | $n_4 = 1.51823$ | $vd_4 = 59.0$ | |
| | $R_7 = -12.7$ | $d_7 = 0.1$ | | | |
| | $R_8 = 360.0$ | $d_8 = 1.0$ | $n_5 = 1.7495$ | $vd_5 = 35.0$ | |
| | $R_9 = 18.85$ | $d_9 = 3.1$ | $n_6 = 1.50032$ | $vd_6 = 81.9$ | |
| | $R_{10} = -20.38$ | | | | | wherein $R_1, R_2, \ldots$ are the radii of curvature of the individual surfaces, $d_1, d_2 \ldots$ are the axial thickness or spacing of the individual elements, WD is the axial distance from the object to the first surface of the lens system, $n_1, n_2 \ldots$ are the refractive indexes of the individual elements and $vd_1, vd_2, \ldots$ are the Abbe numbers of the individual elements.

2. A parfocal low-magnitication microscope objective lens system comprising:
   a positive first lens member disposed at a position nearest to the object and with its convex surface facing the object;
   a negative second lens member disposed at a position farther from said object than said first lens member and including at least one negative meniscus lens component having its convex surface facing the object side; and
   a third positive lens member disposed at a position farthest from said object and including a positive lens component with that surface thereof sharper in radius of curvature facing the image plane side;
   said lens system satisfying the following four conditions:

$$d_A < f_A < d_A + |f_B| \quad (1),$$
$$d_A < d_B \quad (2),$$
$$|f_b| < |f_A| \quad (3),$$
$$|d_B| < |f_B| \quad (4),$$

where $f_A$ is the composite focal length of the first lens member, $f_B$ is the composite focal length of the second lens member, $d_A$ is a rear focal plane of the first lens member to front focal plane of the second lens member distance, and $d_B$ is a rear focal of the second lens member to front focal plane of the third lens member distance, the parameters of said system having the following values:

| | | | WD | = | 4.0 | | |
|---|---|---|---|---|---|---|---|
| 1st member (A) | $R_1$ | = | 17.0 | | | | |
| | | | $d_1$ | = | 2.5 | $n_1 = 1.65128$ | $\nu d_1 = 38.3$ |
| | $R_2$ | = | −95.5 | | | | |
| | | | $d_2$ | = | 10.0 | | |
| 2nd member (B) | $R_3$ | = | 18.1 | | | | |
| | | | $d_3$ | = | 2.5 | $n_2 = 1.76182$ | $\nu d_2 = 26.5$ |
| | $R_4$ | = | −21.2 | | | | |
| | | | $d_4$ | = | 0.8 | $n_3 = 1.51823$ | $\nu d_3 = 59.0$ |
| | $R_5$ | = | 4.62 | | | | |
| | | | $d_5$ | = | 4.0 | | |
| | $R_6$ | = | −7.956 | | | | |
| | | | $d_6$ | = | 2.0 | $n_4 = 1.7495$ | $\nu d_4 = 35.0$ |
| | $R_7$ | = | −20.8 | | | | |
| | | | $d_7$ | = | 14.5 | | |
| 3rd member (C) | $R_8$ | = | −53.1 | | | | |
| | | | $d_8$ | = | 3.5 | $n_5 = 1.58894$ | $\nu d_5 = 61.04$ |
| | $R_9$ | = | −16.559 | | | | |
| | | | $d_9$ | = | 0.3 | | |
| | $R_{10}$ | = | 70.1 | | | | |
| | | | $d_{10}$ | = | 1.4 | $n_6 = 1.71736$ | $\nu d_6 = 29.5$ |
| | $R_{11}$ | = | 21.0 | | | | |
| | | | $d_{11}$ | = | 3.3 | $n_7 = 1.50032$ | $\nu d_7 = 81.9$ |
| | $R_{12}$ | = | −26.584 | | | | | where $R_1, R_2, \ldots$ are the radius of curvature of the individual surfaces, $d_1, d_2 \ldots$ are the axial thickness or spacing of the individual elements, WD is the axial distance from the object to the first surface of the lens system, $n_1, n_2, \ldots$ are the refractive indexes of the individual elements and $\nu d_1, \nu d_2, \ldots$ are the Abbe numbers of individual elements.

3. A parfocal low-magnification microscope objective lens system comprising:
a positive first lens member disposed at a position nearest to the object and with its convex surface facing the object;
a negative second lens member disposed at a position farther from said object than said first lens member and including at least one negative meniscus lens component having its convex surface facing the object side; and
a third positive lens member disposed at a position farthest from said object and including a positive lens component with that surface thereof sharper in radius of curvature facing the image plane side;
said lens system satisfying the following four conditions:

$$d_A < f_A < d_A + |f_B| \qquad (1),$$
$$d_A < d_B \qquad (2),$$
$$|f_B| < |f_A| \qquad (3),$$
$$|d_B| < |f_B| \qquad (4)$$

where $f_A$ is the composite focal length of the first lens member, $f_B$ is the composite focal length of the second lens member, $d_A$ is a rear focal plane of the second lens member distance, and $d_B$ is a rear focal plane of the second lens member to front focal plane of the third lens member distance, the parameters of said system having the following values:

| | | | WD | = | 2.0 | | |
|---|---|---|---|---|---|---|---|
| 1st member (A) | $R_1$ | = | 16.3 | | | | |
| | | | $d_1$ | = | 2.9 | $n_1 = 1.713$ | $\nu d_1 = 53.9$ |
| | $R_2$ | = | 74.0 | | | | |
| | | | $d_2$ | = | 0.2 | | |
| | $R_3$ | = | 17.0 | | | | |
| | | | $d_3$ | = | 1.7 | $n_2 = 1.62004$ | $\nu d_2 = 36.3$ |
| | $R_4$ | = | 24.0 | | | | |
| | | | $d_4$ | = | 8.8 | | |
| 2nd member (B) | $R_5$ | = | 27.0 | | | | |
| | | | $d_5$ | = | 2.4 | $n_3 = 1.76182$ | $\nu d_3 = 26.5$ |
| | $R_6$ | = | −8.0 | | | | |
| | | | $d_6$ | = | 0.8 | $n_4 = 1.74443$ | $\nu d_4 = 49.4$ |
| | $R_7$ | = | 5.72 | | | | |
| | | | $d_7$ | = | 7.8 | | |
| | $R_8$ | = | −5.03 | | | | |
| | | | $d_8$ | = | 1.0 | $n_5 = 1.74443$ | $\nu d_5 = 49.4$ |
| | $R_9$ | = | −27.0 | | | | |
| | | | $d_9$ | = | 15.2 | | |
| 3rd member (C) | $R_{10}$ | = | −110.0 | | | | |
| | | | $d_{10}$ | = | 0.8 | $n_6 = 1.7495$ | $\nu d_6 = 35.0$ |
| | $R_{11}$ | = | 27.84 | | | | |
| | | | $d_{11}$ | = | 2.1 | $n_7 = 1.58894$ | $\nu d_7 = 61.04$ |
| | $R_{12}$ | = | −17.335 | | | | |
| | | | $d_{12}$ | = | 0.2 | | |
| | $R_{13}$ | = | 51.0 | | | | |
| | | | $d_{13}$ | = | 0.8 | $n_8 = 1.67163$ | $\nu d_8 = 38.8$ |
| | $R_{14}$ | = | 25.3 | | | | |
| | | | $d_{14}$ | = | 2.2 | $n_9 = 1.50032$ | $\nu d_9 = 81.9$ |

-continued

| | | |
|---|---|---|
| $R_{15}$ | = | −24.419 | where $R_1$, $R_2$, ... are the radii of curvature of the individual surfaces, $d_1$, $d_2$, ... are the axial thickness or spacing of the individual elements, WD is the axial distance from the object to the first surface of the lens system, $n_1$, $n_2$, .... are the refractive indexes of the individual elements and $\nu d_1$, $d_2$, ... are the Abbe numbers of individual elements.

4. A parfocal low-magnification microscope objective lens system comprising:
a positive first lens member disposed at a position nearest to the object and with its convex surface facing the object;
a negative second lens member disposed at a position farther from said object than said first lens member and including at least one negative meniscus lens component having its convex surface facing the object side; and
a third positive lens member disposed at a position farthest from said object and including a positive lens component with that surface thereof sharper in radius of curvature facing the image plane side;

said lens system satisfying the following four conditions:

$$d_A < f_A < d_A + |f_B| \quad (1),$$
$$d_A < d_B \quad (2),$$
$$|f_B| < |f_A| \quad (3),$$
$$|d_B| > |f_B| \quad (4),$$

where $f_A$ is the composite focal length of the first lens member, $f_B$ is the composite focal length of the second lens member, $d_A$ is a rear focal plane of the first lens member to front focal plane of the second lens member distance, and $d_B$ is a rear focal plane of the second lens member to front focal plane of the third lens member distance, the parameters of said system having the following values:

| | | | | | | | |
|---|---|---|---|---|---|---|---|
| | | | WD | = | 2.1 | | |
| | $R_1$ | = 26.3 | $d_1$ | = | 3.2 | $n_1 = 1.6228$ | $\nu d_1 = 56.9$ |
| 1st member (A) | $R_2$ | = −320.0 | $d_2$ | = | 0.1 | | |
| | $R_3$ | = 14.2 | $d_3$ | = | 2.2 | $n_2 = 1.62041$ | $\nu d_2 = 60.3$ |
| | $R_4$ | = 21.0 | | | | | |
| | | | $d_4$ | = | 15.0 | | |
| | $R_5$ | = 21.0 | $d_5$ | = | 1.5 | $n_3 = 1.7552$ | $\nu d_3 = 27.5$ |
| | $R_6$ | = −9.0 | | | | | |
| 2nd member (B) | $R_7$ | = 9.0 | $d_6$ | = | 0.7 | $n_4 = 1.713$ | $\nu d_4 = 53.9$ |
| | $R_8$ | = −9.0 | $d_7$ | = | 0.5 | | |
| | $R_9$ | = 4.6 | $d_8$ | = | 0.8 | $n_5 = 1.713$ | $\nu d_5 = 53.9$ |
| | | | $d_9$ | = | 16.5 | | |
| | $R_{10}$ | = −51.0 | $d_{10}$ | = | 2.0 | $n_6 = 1.62374$ | $\nu d_6 = 47.0$ |
| | $R_{11}$ | = −13.32 | $d_{11}$ | = | 0.1 | | |
| 3rd member (C) | $R_{12}$ | = 105.0 | $d_{12}$ | = | 0.6 | $n_7 = 1.74$ | $\nu d_7 = 28.2$ |
| | $R_{13}$ | = 17.0 | $d_{13}$ | = | 3.2 | $n_8 = 1.50032$ | $\nu d_8 = 81.9$ |
| | $R_{14}$ | = −20.28 | | | | | | where $R_1$, $R_2$, ... are the radii of curvature of the individual surfaces, $d_1$, $d_2$, ... are the axial thickness or spacing of individual elements, WD is the axial distance from the object to the first surface of the lens system, $n_1$, $n_2$, ... are the refractive indexes of the individual elements and $\nu d_1$, $\nu d_2$, ... are the Abbe numbers of individual elements.

* * * * *